United States Patent Office 3,167,547
Patented Jan. 26, 1965

1

3,167,547
17-TETRAHYDROPYRANYL ETHERS OF 19-NOR,
3-KETO ANDROSTANES
Alexander D. Cross, Mexico City, Mexico, assignor to
Syntex Corporation, Panama, Panama, a corporation
of Panama
No Drawing. Filed Nov. 18, 1963, Ser. No. 324,236
10 Claims. (Cl. 260—239.55)

This invention relates to novel cyclopentanopolyhydrophenanthrene derivatives and to processes for the preparation thereof.

More particularly, this invention relates to novel 17-tetrahydropyranyl ethers of 19-nor-10α- and 19-nor-10β-androstanes and -Δ¹-androstenes represented by the general formulas:

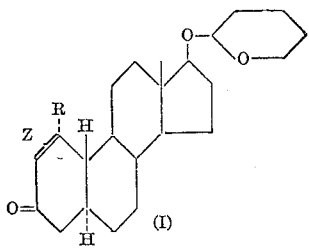

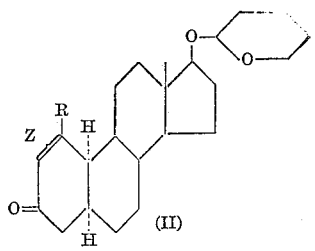

In these formulas R represents hydrogen or methyl and Z represents either a saturated linkage or a double bond between the carbon atoms at the 1- and 2-positions of the steroid nucleus.

A considerable amount of research in the steroid field has been done in the area of anabolic agents, inasmuch as such compounds are useful in many areas of human and veterinary medicine. Thus, for example, an important application of anabolic agents in human therapy is in cases where the patient suffers from any of a number of debilitating diseases or conditions which produce a negative nitrogen balance, such as deficient nutrition or growth, chronic cachetic diseases, and osteoporosis, wherein it is necessary to increase the metabolism of proteins and obtain a positive nitrogen balance and greater deposition of calcium bone tissues. Similarly, anabolic agents are extremely useful in the post-operative treatment of patients recovering from major surgical operations.

It is known that androstane derivatives such as testosterone, 19-nortestosterone and various substituted derivatives thereof exhibit good anabolic activity when administered parenterally, and that this is particularly the case with 17α-alkyl substituted derivatives such as 17α-methyltestosterone, 6α,17α-dimethyltestosterone, 2-hydroxymethylene-17α-methyldihydroallotestosterone, 2α,17α-dimethyldihydroallostestosterone and the like. However, it is also known that androstane derivatives of the type in question which do not have a 17α-alkyl substituent exhibit either very low anabolic activity or no anabolic activity at all when administered orally.

The present invention is based on the surprising and unexpected discovery that the novel 17-tetrahydropyranyl ethers represented by the above general formulas, unlike the corresponding 17-unetherified compounds, exhibit good anabolic activity when administered orally. In addition, the androgenic activity of these 17β-tetrahydropyranyloxy derivatives is low. Thus, when their anabolic/androgenic activity is measured by administering them orally to castrated young male rats and then determining the response to this treatment by increases in the weights of the ventral prostate, seminal vesicles and levator ani muscle, it is found that these 17-tetrahydropyranyl ethers possess very low androgenic activity, while their anabolic activity is markedly greater than that of testosterone.

These novel 17-tetrahydropyranyl ethers also possess anti-estrogenic and anti-ovulatory activity, lower blood cholesterol levels, and inhibit the secretion of gonadotrophins by the pituitary gland.

The 17-tetrahydropyranyl ethers of the present invention are obtained from the corresponding 11β-hydroxy steroids by conventional methods of preparing tetrahydropyranyl ethers of steroids having free hydroxyl groups. Thus, the free 17β-hydroxyl-containing parent compound can be reacted, under substantially anhydrous conditions, with an excess of dihydropyran in the presence of a small amount of an acidic catalyst, e.g., hydrochloric acid, p-toluenesulfonic acid, boron trifluoride etherate, and the like, either alone or together with an inert organic solvent such as benzene, diethyl ether, or the like, at a temperature of from about 0° C. to about 50° C., and preferably at room temperature (about 25° C.), for from about 1 hour to about 72 hours.

These novel compounds can be administered in any of a number of conventional pharmaceutical forms, and particularly in ones suited for oral administration, e.g., in solid form, such as in pills, powders, capsules, tablets, or the like, or in liquid form, as syrups, emulsions, suspensions, and the like.

In order that those skilled in the art can more fully understand the present invention, the following examples are set forth. These examples are given solely for the purpose of illustrating the invention, and should not be considered as expressing limitations unless so set forth in the appended claims.

PREPARATION A

A mixture of 1 gram of 19-nor-10α-androstan-17β-ol-3-one [R. J. Rapala et al., J. Org. Chem., vol. 23, page 1404 (1958)], 20 cc. of dioxane and 700 mg. of 2,3-dichloro-5,6-dicyano-1,4-benzoquinone was refluxed for 10 hours. Following this reaction period the mixture was cooled, the 2,3-dichloro-5,6-dicyano-1,4-benzohydroquinone formed during the reaction was filtered off, and the filtrate was evaporated to dryness. The resulting dry residue was chromatographed on 50 grams of neutral alumina, thus giving pure 19-nor-10α-Δ¹-androsten-17β-ol-3-one and 19-nor-10α-Δ⁴-androsten-17β-ol-3-one.

PREPARATION B

A mixture of 2.5 grams of 1α-methyl-19-nor-androstan-

17β-ol-3-one 17-acetate, 40 cc. of isopropenyl acetate and 120 mg. of p-toluenesulfonic acid was refluxed using an air condenser, so that approximately 5 cc. of isopropenyl acetate distilled off over a period of 30 minutes thus removing moisture from the reaction mixture. At the end of this time, a water-cooled condenser was substituted for the air condenser, and refluxing was continued for 24 hours.

Following this reaction period, the reaction mixture was cooled and then diluted with ethyl acetate. Next, the dilute solution was washed with water, then with an aqueous sodium bicarbonate solution, and finally with water again until neutral. The neutral solution was then dried over anhydrous sodium sulfate and evaporated to dryness, thus giving crude 1α-methyl-19-nor-Δ²-androstene-3,17β-diol-3,17-diacetate.

A solution of the thus-obtained crude diacetate containing 20 cc. of carbon tetrachloride, 80 cc. of glacial acetic acid and 1 gram of sodium acetate was treated dropwise, with stirring, over a 30 minute period at room temperature, with a solution of 1.1 molar equivalents of bromine in 10 cc. of acetic acid. The resulting solution was then diluted with water and extracted with methylene chloride. The organic extract was washed with water, dried over anhydrous sodium sulfate and evapoarted to dryness under reduced pressure. Crystallization of the resulting residue from acetone/hexane gave pure 2-bromo-1αmethyl-19-norandrostan-17β-ol-3-one 17-acetate.

A solution of 2 grams of the thus-obtained 2-bromo intermediate in 20 cc. of cold dimethylformamide was added over a 5 minute period to a refluxing suspension of 5 grams of finely divided calcium carbonate in 15 cc. of dimethylformamide. The resulting reaction mixture was refluxed for an additional 30 minutes, then cooled and filtered. The filtrate was diluted with water and extracted with ethyl acetate, and the extract was washed with dilute aqueous hydrochloric acid, then with water, then with an aqueous sodium bicarbonate solution and finally with water. The washed extract was then dried over anhydrous sodium sulfate and evaporated to dryness. The resulting dry residue was chromatographed on 100 grams of netural alumina, and the fractions eluted with hexane/benzene (20/80, respectively), gave pure 1-methyl-19-nor-Δ¹-androsten-17β-ol-3-one 17-acetate.

A solution of 1 gram of the thus-obtained 17-acetate in 50 cc. of methanol was refluxed for 3 hours with 200 mg. of potassium hydroxide dissolved in 1 cc. of water. Following this reaction period the reaction mixture was poured into ice water and the resulting precipitate collected by filtration, washed with water until neutral and then dried. The resulting crude product, upon recrystallization from methylene chloride/diethyl ether, yielded pure - 1-methyl-19-nor-Δ¹-androsten-17β-ol-3-one.

By repeating this procedure in every detail but one, namely, replacing 1α-methyl-19-nor-androstan-17β-ol-3-one 17-acetate with 1β-methyl-19-nor-10α-androstan-17β-ol-3-one 17-benzoate (prepared as described in Preparation C hereinbelow), there were successively obtained 1β-methyl-19-nor-10α-Δ²-androstene-3,17β-diol 3-acetate-17 - benzoate, 2-bromo-1β-methyl-19-nor-10α-androstan-17β-ol-3-one 17-benzoate, 1-methyl-19-nor-10α-Δ¹-androsten-17β-ol-3-one 17-benzoate and 1-methyl-19-nor-10α-Δ¹-androsten-17β-ol-3-one.

PREPARATION C

A mixture of 5 grams of 1-methylestrone, 20 cc. of pyridine and 10 cc. of acetic anhydride was kept at room temperature overnight. Following this reaction period the mixture was diluted with water, and the resulting precipitate was collected by filtration, washed with water and air-dried. Crystalliaztion from acetone/hexane gave pure 1-methylestrone 3-acetate.

A solution of 4 grams of the thus-obtained 3-acetate in 250 cc. of 95% ethanol, containing 250 mg. of ruthenium oxide hydrogenation catalyst, was hydrogenated at 150° C. under a pressure of 1500 pounds per square inch for about 16 hours. Following this reaction period the catalyst was filtered off and the filtrate evaporated to dryness. The resulting residue was crystallized from acetone/diethyl ether to give 1β-methyl-19-nor-10α-androstane-3β,17β-diol 3-acetate.

A mixture of 2 grams of the thus-obtained 1β-methyl steroid, 8 cc. of pyridine and 4 cc. of benzoyl chloride was heated on a steam bath for 1 hour. Following this reaction period the mixture was poured into ice water, and the resulting precipitate was collected by filtration, washed with water and dried. Recrystallization from methylenechloride/hexane gave 1β - methyl-19-nor-10α-androstane-3β,17β-diol 3-acetate-17-benzoate.

A mixture of 2 grams of the thus-obtained diester, 50 cc. of methanol and 5 cc. of an aqueous 4% potassium hydroxide solution was stirred at 0° C. for 1 hour under an inert nitrogen atmosphere. Following this reaction period the mixture was neutralized with acetic acid and the methanol then distilled off under reduced pressure. The resulting residue was triturated with water and the solid collected, washed with water, dried and then recrystallized from ethyl acetate/methanol, thus giving 1β-methyl-19-nor-10α-androstane-3β,17β-diol-17-benzoate.

A solution of 1.5 grams of the thus-obtained 17-benzoate in 20 cc. of acetone was cooled to 0° C. and then treated, with stirring, under an inert nitrogen atmosphere, with an 8 N chromic acid solution (prepared by mixing 26 g. of chromium trioxide with 23 cc. of concentrated sulfuric acid and diluting with water to 100 cc.) until the color of the reagent persisted in the reaction mixture. The reaction mixture was then stirred for 5 minutes more at 0–5° C., then diluted with water. The resulting precipitate was collected, washed with water and dried under vacuum, thus giving 1β-methyl-19-nor-10α-androstan-17β-ol-3-one 17-benzoate which, after saponification in the manner described in Preparation B, gave 1β-methyl-19-nor-10α-androstan-17β-ol-3-one.

*Example*

To a solution of 1 gram of 19-norandrostan-17β-ol-3-one (19-nordihydroallotestosterone) in 25 cc. of benzene there was added 2 cc. of dihydropyran. Next, approximately 5 cc. of the mixture of benzene and dihydropyran was distilled off to remove moisture, and the remaining mixture was then cooled to room temperature. To the cooled mixture there was then added 0.1 gram of p-toluenesulfonic acid, and the resulting reaction mixture was held at room temperature for 72 hours. Following this reaction period the reaction mixture was washed with an aqueous 5% sodium carbonate solution and then with water until neutral, then dried over anhydrous sodium sulfate and evaporated to dryness. The dry residue was then chromatographed by passing it, dissolved in hexane, through a column of neutral alumina, thus giving the 17-tetrahydropyranyl ether of 19-norandrostan-17β-ol-3-one (17β-tetrahydropyranyloxy-19-norandrostan-3-one).

By repeating this procedure in every detail but one, namely, replacing 19-norandrostan-17β-ol-3-one with 19-nor - 10α - androstan - 17β - ol - 3 - one, 1α-methyl-19-nor-androstan - 17β - ol - 3 - one, 1β - methyl - 19 - nor - 10α-androstan - 17β - ol - 3 - one, 19 - nor - Δ¹ - androsten-17β-ol - 3 - one, 19 - nor - 10α - Δ¹ - androsten - 17β - ol - 3 - one, 1 - methyl - 19 - nor - Δ¹ - androsten - 17β - ol - 3 - one and 1 - methyl - 19 - nor - 10α-Δ¹-androsten-17β-ol-3-one, respectively, the corresponding 17-tetrahydropyranyl ethers, namely 17β-tetrahydropyranyloxy-19-nor-10α-androstan - 3 - one, 1α - methyl - 17β - tetrahydropyranyloxy - 19 - norandrostan - 3 - one, 1β - methyl - 17β - tetrahydropyranyloxy - 19 - nor - 10α - androstan - 3 - one, 17β - tetrahydropyranyloxy - 19 - nor - Δ¹ - androsten - 3 - one, 17β - tetrahydropyranyloxy - 19 - nor - 10α - Δ¹ - androsten-3-one, 1-methyl-17β-tetrahydropyranyloxy-19-nor-Δ¹ - androsten - 3 - one, and 1-methyl-17β-tetrahydropyranyloxy-19-nor-10α-Δ¹-androsten-3-one, respectively, were obtained.

I claim:
1. A compound represented by the formula:

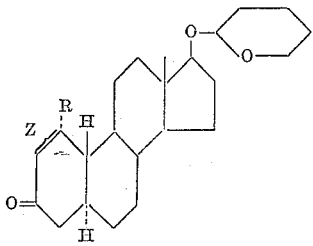

wherein R is selected from the group consisting of hydrogen and methyl and Z is selected from the group consisting of a saturated linkage and a double bond.

2. The 17-tetrahydropyranyl ether of 19-norandrostan-17β-ol-3-one.
3. The 17-tetrahydropyranyl ether of 1α-methyl-19-norandrostan-17β-ol-3-one.
4. The 17-tetrahydropyranyl ether of Δ¹-19-norandrosten-17β-ol-3-one.
5. The 17-tetrahydropyranyl ether of 1-methyl-Δ¹-19-norandrosten-17β-ol-3-one.

6. A compound represented by the formula:

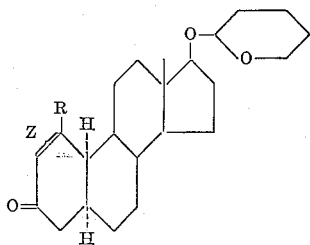

wherein R is selected from the group consisting of hydrogen and methyl and Z is selected from the group consisting of a saturated linkage and a double bond.

7. The 17-tetrahydropyranyl ether of 19-nor-10α-androstan-17β-ol-3-one.
8. The 17-tetrahydropyranyl ether of 1β-methyl-19-nor-10α-androstan-17β-ol-3-one.
9. The 17-tetrahydropyranyl ether of Δ¹-19-nor-10α-androsten-17β-ol-3-one.
10. The 17-tetrahydropyranyl ether of 1-methyl-Δ¹-19-nor-10α-androsten-17β-ol-3-one.

References Cited in the file of this patent

Ruggieri et al.: "Gazz, Chim. Ital.," vol. 91, June 1961, pp. 686–705.